(12) United States Patent
Gandhi (10) Patent No.: US 8,684,690 B2
(45) Date of Patent: Apr. 1, 2014

(54) VARIABLE CHORD MORPHING HELICOPTER ROTOR

(75) Inventor: Farhan Gandhi, State College, PA (US)

(73) Assignees: Agustawestland North America, Inc, Reston, VA (US); Farhan Gandhi, State College, PA (US)

(*) Notice: Subject to any disclaimer, the term of this patent is extended or adjusted under 35 U.S.C. 154(b) by 793 days.

(21) Appl. No.: 12/787,278

(22) Filed: May 25, 2010

(65) Prior Publication Data

US 2010/0303630 A1  Dec. 2, 2010

Related U.S. Application Data

(60) Provisional application No. 61/181,061, filed on May 26, 2009.

(51) Int. Cl.
*B64C 11/28* (2006.01)

(52) U.S. Cl.
USPC ................ 416/1; 416/23; 416/48; 416/169 R (58) Field of Classification Search
USPC .......... 415/119; 416/1, 23–24, 31, 36–37, 42, 416/44, 47–48, 87–89, 169 R
See application file for complete search history.

(56) References Cited

U.S. PATENT DOCUMENTS

| | | | |
|---|---|---|---|
| 4,297,078 A * | 10/1981 | Martin | 416/134 A |
| 6,139,268 A * | 10/2000 | Murawski et al. | 416/23 |
| 7,763,818 B2 * | 7/2010 | Lusk et al. | 200/341 |
| 7,931,240 B2 | 4/2011 | Kothera et al. | |
| 2008/0035788 A1 * | 2/2008 | Kothera et al. | 244/99.8 |
| 2008/0237395 A1 * | 10/2008 | Tanabe et al. | 244/1 N |

* cited by examiner

*Primary Examiner* — Nathaniel Wiehe
*Assistant Examiner* — Woody A Lee, Jr.
(74) *Attorney, Agent, or Firm* — MH2 Technology Law Group, LLP (57) ABSTRACT

A variable chord morphing helicopter rotor blade is disclosed. The variable chord morphing helicopter rotor blade includes an extensible quasi-static chord section connected to the rotor blade, an adjusted airfoil chord length of the rotor blade corresponding to extension of the quasi-static chord section relative to a baseline airfoil chord length, the adjusted airfoil chord length determined according to helicopter flight conditions.

16 Claims, 11 Drawing Sheets

VARIABLE CHORD MORPHING HELICOPTER ROTOR

CROSS-REFERENCE TO RELATED APPLICATION

This application claims priority to U.S. Provisional Patent Application Ser. No. 61/181,061 filed on May 26, 2009, the disclosure of which is incorporated herein by reference in its entirely.

FIELD

This invention relates generally to rotor blades and, more particularly to helicopter rotor or tilt rotor blades with a quasi-static extendible chord section.

BACKGROUND

A rotor blade when moving in the same direction as the aircraft is called an advancing blade and when moving in the opposite direction is called a retreating blade. One of the primary factors limiting an operating envelope of a rotorcraft is onset of retreating blade stall. Retreating blade stall is a hazardous flight condition in helicopters and other rotary wing aircraft, where the rotor blade rotating away from the direction of flight stalls. Retreating blade stall is more likely to occur when the following conditions exist either alone or in combination: low relative airspeed and/or excessive angle of attack (or AOA), high gross weight, high airspeed, low rotor RPM, high density altitude, steep or abrupt turns, and turbulent ambient air.

Retreating blade stall is a limiting factor of a helicopter's airspeed, and the reason even the fastest helicopters can only fly slightly faster than 200 knots. In flight conditions at high speed, or even at slightly reduced speeds in the case of high aircraft gross-weight and/or altitude, retreating blade stall leads to a loss in lift, sharp increase in drag and pitching moment, globally reduces blade capabilities, and induces high vibration and control loads. Alleviating retreating blade stall is therefore of much interest when operating close to flight envelope boundaries, i.e. at high altitude, air speeds, or high gross weight.

In part because of the need for controlling retreating blade stall, and thereby expanding the operating envelope, there has recently been interest using active control and shape adaptation on helicopter rotor blades. Certain of these efforts have been directed to enhancing rotorcraft performance by reconfiguring a chord of the rotor blade. Examples of known modified chord configurations for rotor blades include Trailing-Edge Flaps (TEFs) and Gurney Flaps (GF).

Figure 1A:
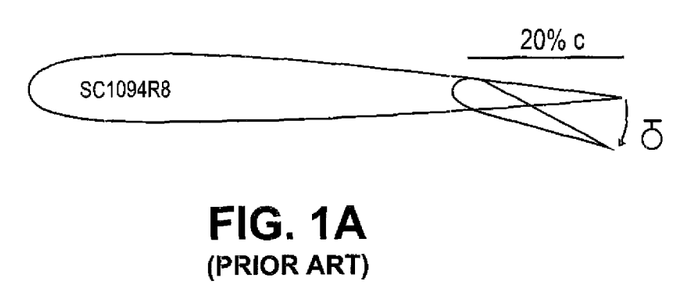
FIGS. 1A and 1B, are side views of prior art designs for a chord of a helicopter rotor blade.

A rotor blade having a trailing edge flap is depicted in FIG. 1A and literally includes a pivoting flap formed at a trailing edge of the rotor blade. The flap can be angularly adjusted relative to the remainder of the rotor blade air foil section, as shown.

Figure 1B:
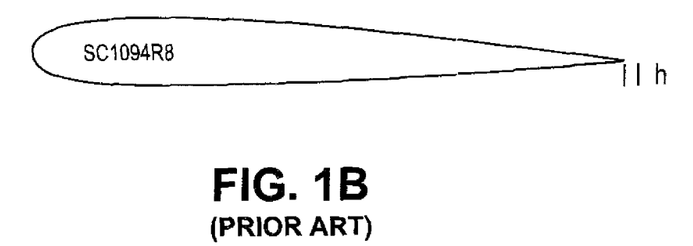

A rotor blade having a Gurney flap is depicted in FIG. 1B and includes a small flat tab projecting from the trailing edge of a wing. Typically the Gurney flap is set at a right angle to the pressure side surface of the airfoil, and projects a distance of about 1% to 2% of the wing chord. The Gurney flap operates by increasing pressure on the pressure side, decreasing pressure on the suction side, and helping a boundary layer flow stay attached all the way to the trailing edge on the suction side of the airfoil.

While suitable to a certain extent, each of the trailing edge flap and Gurney flap are limited in their use. In particular, each of these devices maintains a non-adjustable fixed chord line dimension from a leading edge to a trailing edge of the chord.

BRIEF SUMMARY

The following relate to preferred exemplary embodiments herein disclosing structure of a variable chord rotor.

The exemplary variable chord rotor can include an extensible chord plate housed within the rotor blade. Depending upon flight conditions, the extensible chord plate can be extended to a position external of the rotor blade through a slit in a trailing edge of that section and retracted to a position internal to the rotor blade, respectively, and in a direction of the chord line.

Additional embodiments of the disclosure will be set forth in part in the description which follows, and in part will be obvious from the description, or may be learned by practice of the present disclosure. The embodiments of the disclosure will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The invention is best understood from the following detailed description when read with the accompanying FIGURES. It will be appreciated that various features may not be drawn to scale. In fact, the dimensions of various features may be arbitrarily increased or reduced for clarity of discussion. Reference is now made to the following descriptions taken in conjunction with the accompanying drawings, in which.

DETAILED DESCRIPTION

In the following description, reference is made to the accompanying drawings that form a part thereof, and in which is shown by way of illustration specific exemplary embodiments which may be practiced. Wherever possible, the same reference numbers will be used throughout the drawings to refer to the same or like parts. These embodiments are described in sufficient detail to enable those skilled in the art to practice the embodiments and it is to be understood that other embodiments may be utilized and that changes may be made without departing from the scope of the invention. The following description is, therefore, merely exemplary.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

As used herein, the term "leading edge" refers to the front most portion of the rotor blade and the term trailing edge refers to the rearmost portion of the rotor blade along the direction of the rotor blade chord.

As used herein, the terms "chord" and "chord line" refer to the straight line joining the leading and trailing edges of the rotor blade.

As used herein, "angle of attack" (AOA, a) is a term used to describe the angle between the chord line of an airfoil and the vector representing the relative motion between the body and the fluid through which it is moving. The angle of attack would be the angle between the line and the oncoming flow.

Figure 2:
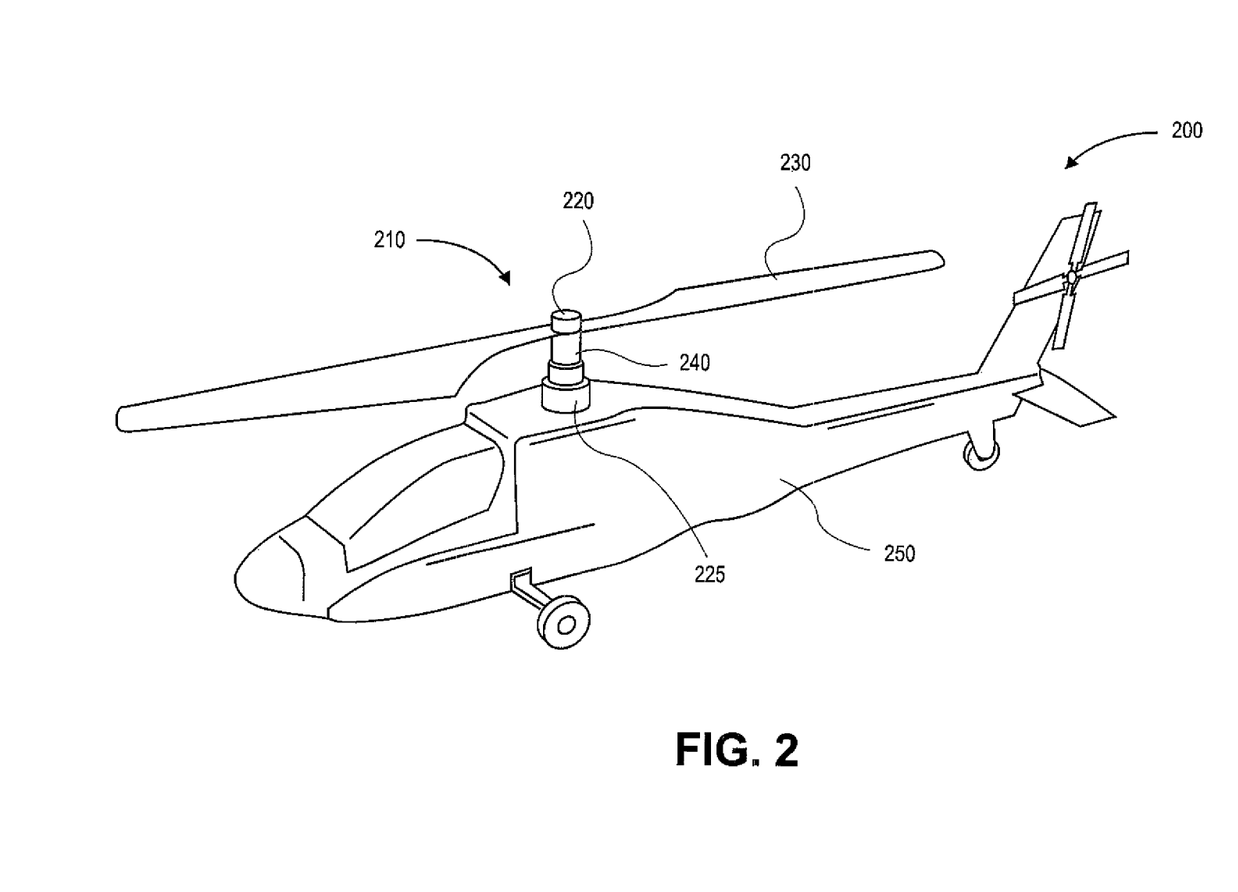
FIG. 2 is a side view depicting an exemplary helicopter according to certain embodiments.

FIG. 2 is a perspective view depicting an exemplary helicopter 200 according to certain embodiments. It should be readily apparent to those skilled in the art that FIG. 2 is exemplary and that other elements can be added, removed or modified without departing from the scope of the exemplary embodiments. It will be appreciated that FIG. 2 is provided to depict a general helicopter 200 as can be used in connection with the present invention, and that certain examples for implementing the invention will be illustrated in subsequent figures.

In certain embodiments, the exemplary helicopter 200 can include a rotor assembly 210 mounted on a vehicle body 250. The rotor assembly 210 can include a rotor hub 220, two or more rotor blades 230, a connector 240, and power components 225. While FIG. 2 depicts several components of the rotor assembly 210, one skilled in the art will realize that the rotor assembly 210 can include any number and type of components.

The rotor hub 220 can be formed of a material, using any process, to any dimension and specification, as known in the art. For example, the rotor hub 220 can be formed of a metal and include a drive shaft or the like to impart rotation to the rotor hub. As depicted, the rotor hub 220 can be driven to rotate at a rotational speed according to desired flight requirements of a helicopter.

The connector 240 can connect the rotor hub 220 to the power components 225. The connector 240 can be formed of a material, using any process, to any dimension and specification as known in the art.

Figure 3A:
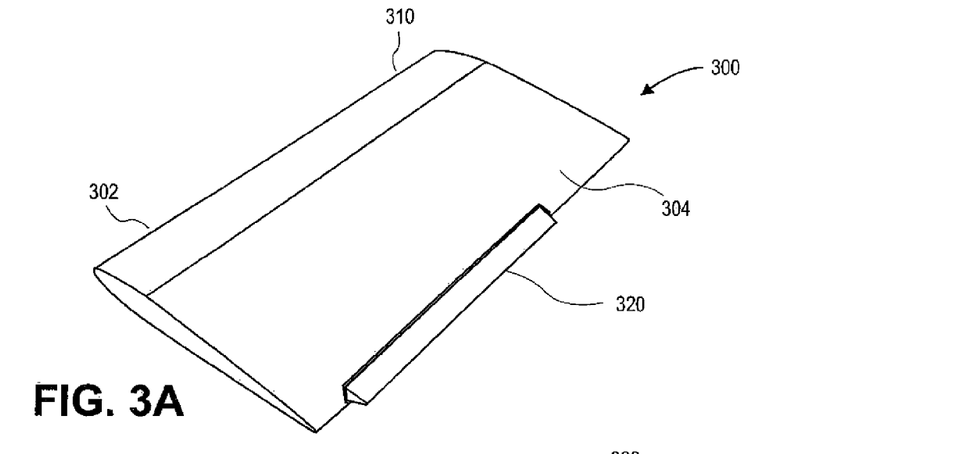
FIGS. 3A, 3B and 3C are perspective views of a variable chord rotor blade at different extensions.
Figure 3B:
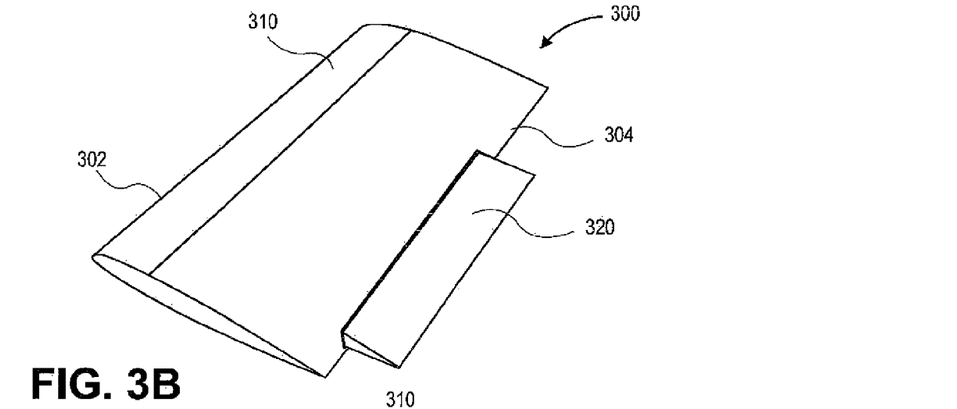
Figure 3C:
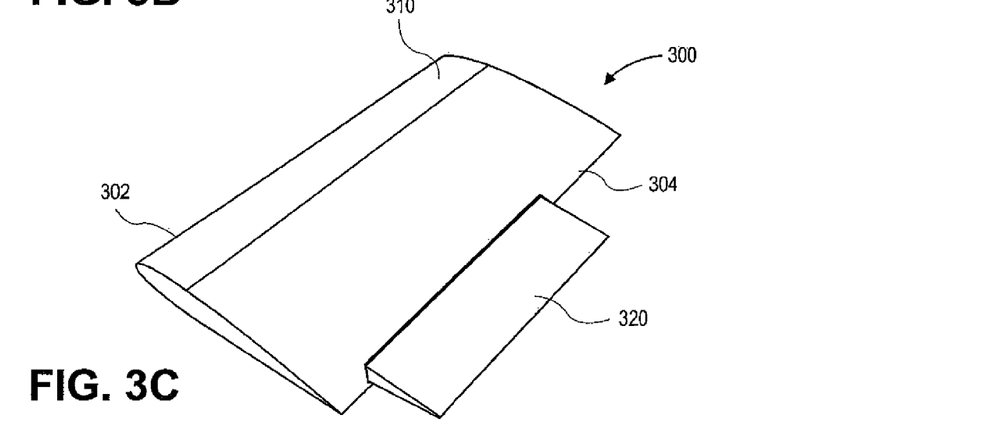
Figure 3D:
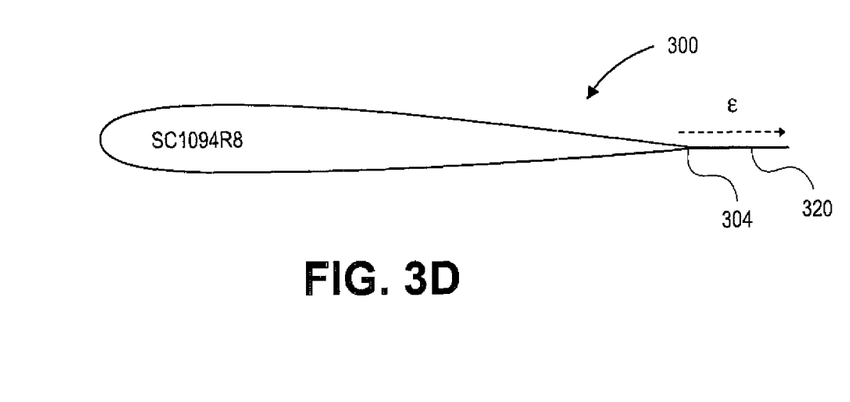
FIGS. 3D and 3E are side views depicting a chord plate orientation relative to a remainder of the rotor blade, according to certain embodiments.
Figure 3E:
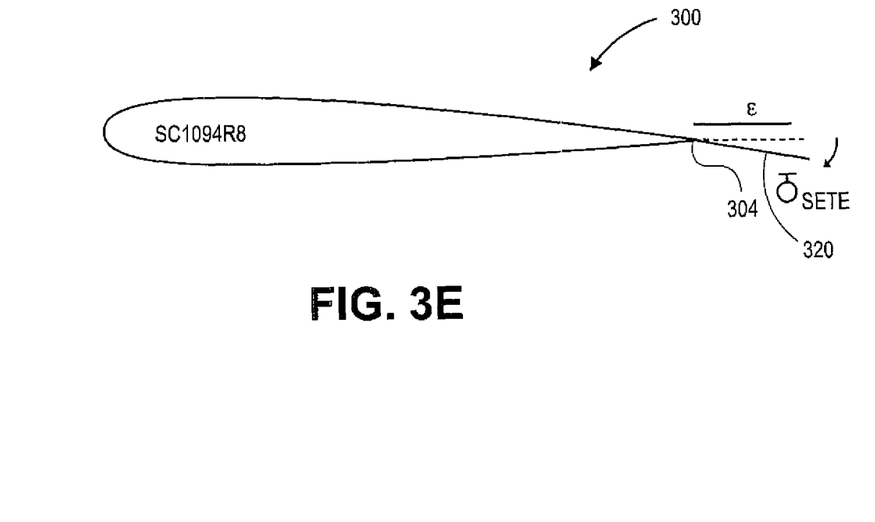

FIGS. 3A, 3B and 3C are perspective views of a spanwise section of a variable chord rotor blade 300 at different extensions, and FIGS. 3D and 3E are side views depicting a chord plate orientation relative to a remainder of the rotor blade, according to certain embodiments. It should be readily apparent to those skilled in the art that FIGS. 3A, 3B, 3C, 3D, and 3E are exemplary and that other elements can be added, removed or modified without departing from the scope of the exemplary embodiments. It will be appreciated that FIGS. 3A-3E are provided to depict the general concept of the present invention, and that certain examples for implementing the concept will be illustrated in subsequent figures.

The variable chord rotor blade 300 can include a leading edge 302 and a trailing edge 304. The edges are intended to encompass an entire span (i.e. length) of the rotor blade 300. The variable chord rotor blade 300 can further include a spar 310 at the leading edge 302 and an extensible chord plate 320 at the trailing edge 304. The extensible chord plate 320 can extend and retract relative to a remainder of the rotor blade 300 (for example, relative to the spar 310), and in certain embodiments, from a slot, at the trailing end 304 of the rotor blade 300. In certain embodiments, the extensible chord plate 320 can be stowed (FIG. 3A), partially extended (FIG. 3B) and fully extended (FIG. 3C). Upon extending or retracting the extensible chord plate 320, the chord line of the variable chord rotor blade 300 can be correspondingly adjusted.

FIG. 3D depicts a chord plate 320 having a deployment (e.g. extended) orientation of 0° relative to the trailing edge 304 of the rotor blade 300. FIG. 3E depicts a chord plate having a deployment orientation of δ relative to the trailing edge 304 of the rotor blade 300. Either of these deployment conditions can be used in exemplary embodiments disclosed.

Figure 4A:
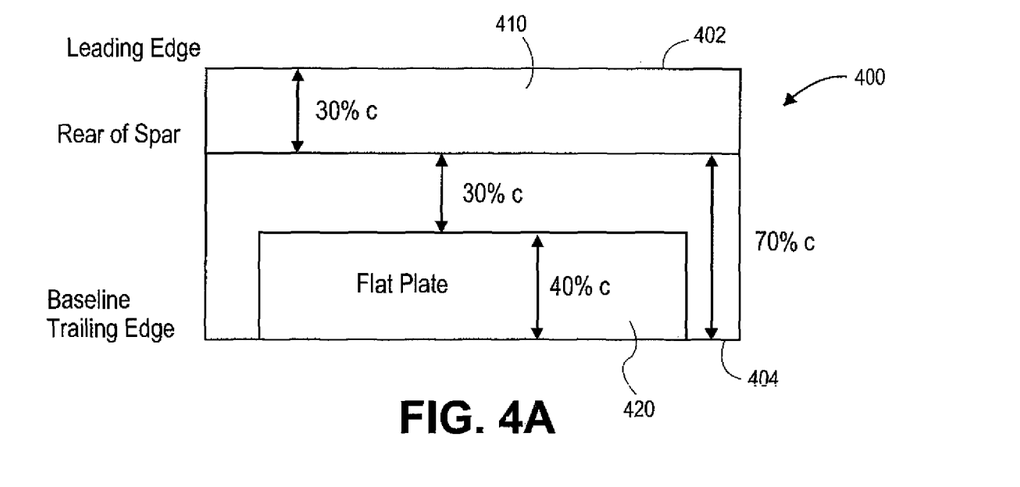
FIGS. 4A and 4B are schematic diagrams depicting stowed and deployed states of an exemplary chord plate according to certain embodiments.
Figure 4B:
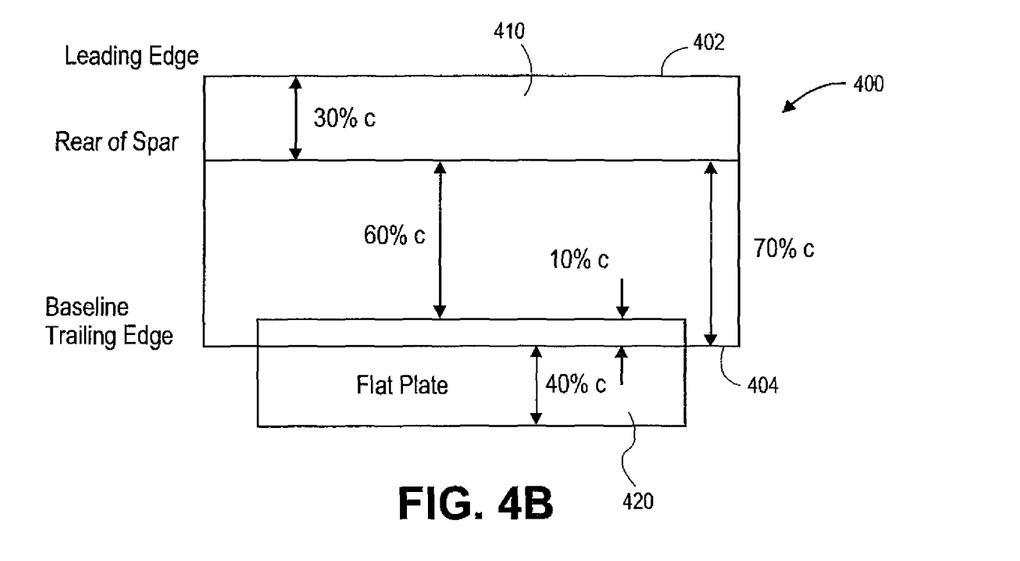

FIGS. 4A and 4B are schematic diagrams depicting stowed and extended states of an exemplary variable chord rotor blade 400 according to certain embodiments. It should be readily apparent to those skilled in the art that FIGS. 4A and 4B are exemplary and that other elements can be added, removed or modified without departing from the scope of the exemplary embodiments.

The variable chord rotor blade 400 can include a leading edge 402 and a trailing edge 404. The variable chord rotor blade 400 can further include a spar 410 at the leading edge 402 and an extensible chord plate 420 at the trailing edge 404. The extensible chord plate 420 can extend and retract relative to a remainder of the rotor blade 400, and from the trailing end 404 of the rotor blade 400. In certain embodiments, the extensible chord plate 420 can be stowed (FIG. 4A) and fully extended (FIG. 4B). Upon extending or retracting the extensible chord plate 420, the chord line of the variable chord rotor blade 400 can be correspondingly adjusted.

Unlike fixed-wing aircraft in which the wing chord length and thickness are large enough to easily accommodate internal devices, the small size of a rotorcraft blade can have stringent space constraints. An exemplary base chord line can be about 10.75 inches. Assuming a 12% thick airfoil, the maximum thickness would be about 1.29 inches. This is based on the BO-105 blade chord, and ensures that a static extended trailing edge device, with an actuation mechanism fitting within these dimensions would not present any problems when applied to larger rotorcraft such as the UH-60, AH64, V22, and EH101. The leading edge spar 410 can be about 30% of the chord.

With the rear of the spar 410 extending to about 30% of total chord length, the remaining 70% (7.35 in) of the chord length can be available for the extensible chord plate 420 and an actuating mechanism (not depicted in FIG. 4A or 4B). FIG. 4A depicts the chord plate 420 in a retracted position and FIG. 4B depicts the chord plate 420 in an extended or deployed position. An extension of the chord plate 420 can be about 30% of the chord length, and with some overlap in the deployed configuration, the chord plate 420 can be about 40% of the chord length (3.58 in). The remaining 30% of the chord length (3.23 in) can be used for the actuation system/mechanism in the retracted configuration of FIG. 4A.

Although there is not as stringent a limit on the spanwise dimensions of the actuation system, it is preferred that it does not extend much beyond the spanwise dimension of the chord plate from an installation complexity standpoint.

Figure 5A:
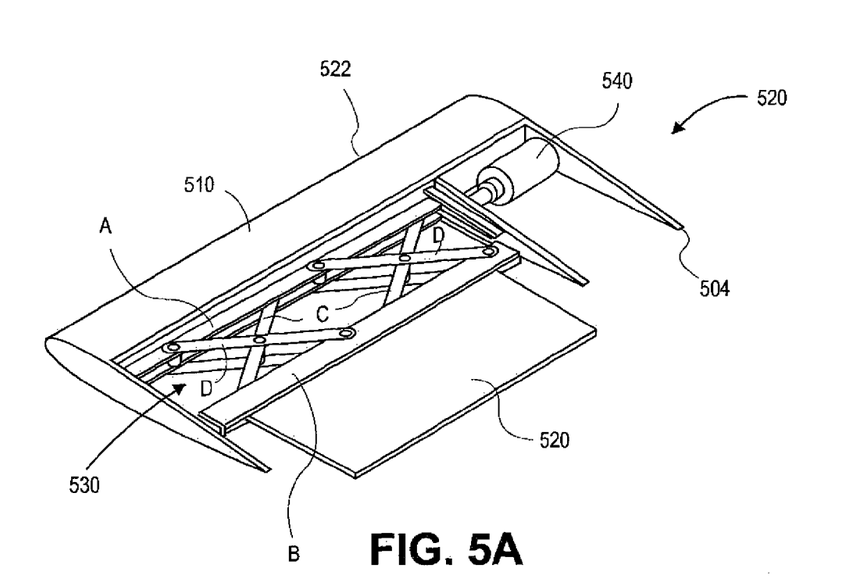
FIG. 5A is a perspective view and FIG. 5B is a top plan view of an exemplary variable chord rotor blade assembly according to certain embodiments.
Figure 5B:
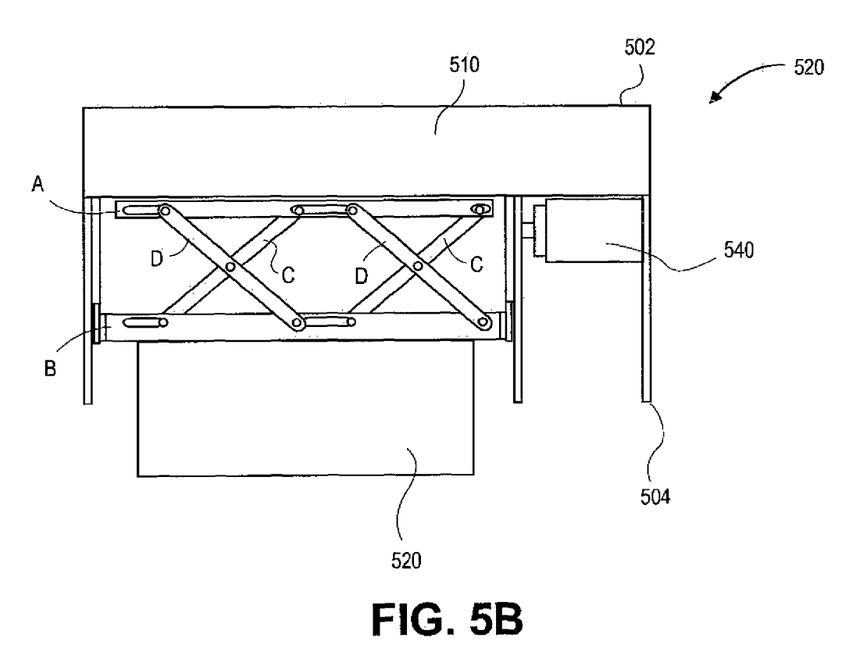
Figure 6A:
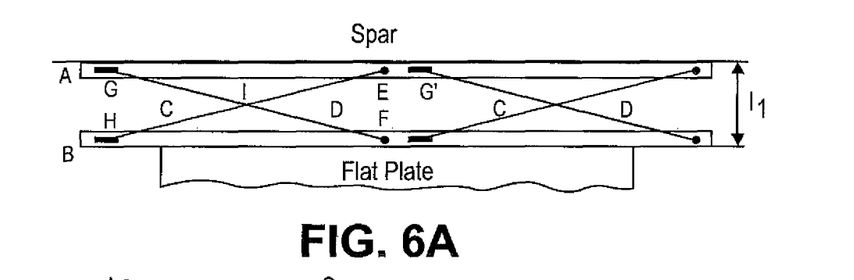
FIGS. 6A and 6B are schematic diagrams of exemplary internal mechanisms of the variable chord rotor blade according to certain embodiments.
Figure 6B:
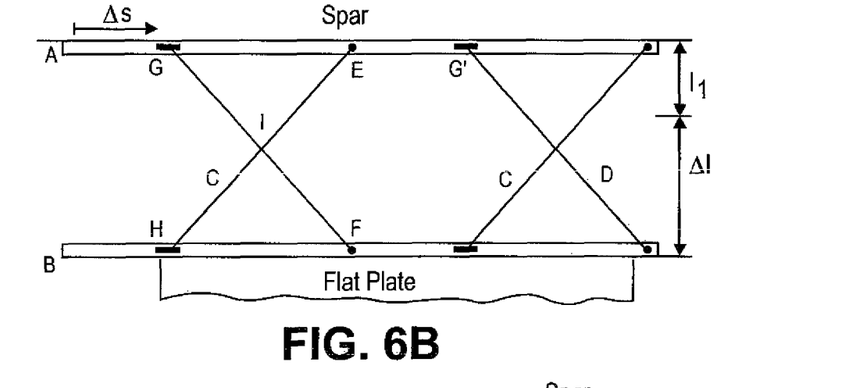
Figure 7A:
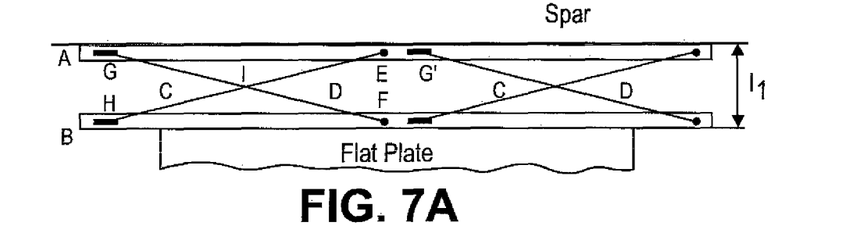
FIGS. 7A and 7B are schematic diagrams of exemplary internal mechanisms of the variable chord rotor blade according to certain embodiments.
Figure 7B:
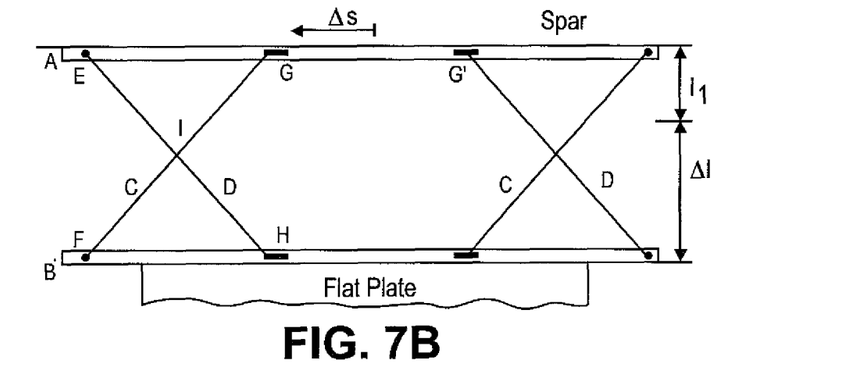
Figure 8A:
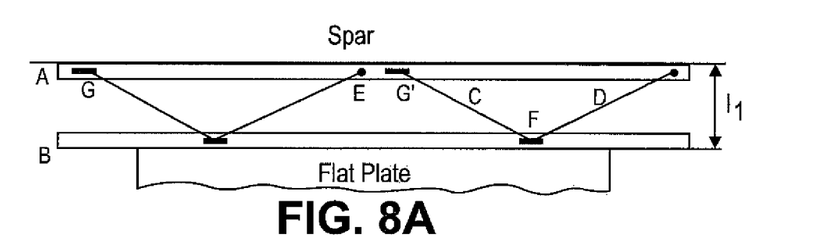
FIGS. 8A and 8B are schematic diagrams of exemplary internal mechanisms of the variable chord rotor blade according to certain embodiments.
Figure 8B:
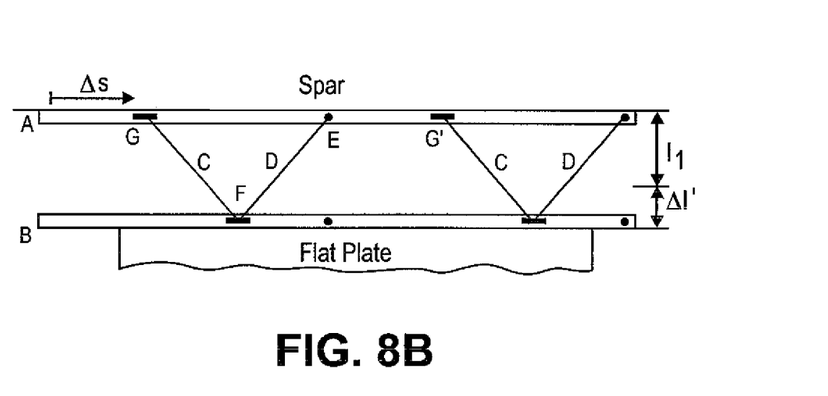

FIG. 5A is a perspective view and FIG. 5B is a top view of an exemplary variable chord rotor blade assembly according to certain embodiments. It should be readily apparent to those skilled in the art that FIGS. 5A and 5B are exemplary and that other elements can be added, removed or modified without departing from the scope of the exemplary embodiments.

A variable chord rotor blade 500 can include a leading edge 502 and a trailing edge 504. The variable chord rotor blade 500 can further include a spar 510 at the leading edge 502 and an extensible chord plate 520 at the trailing edge 504. The extensible chord plate 520 can extend and retract relative to a remainder of the rotor blade 500, and from the trailing end 504 of the rotor blade 500. In certain embodiments, the extensible chord plate 520 can be stowed, fully extended, and positioned intermediate stowed and extended positions. The variable chord rotor blade 500 can further include an actuation mechanism 530, and a housing 540 for a motor 542. The actuation mechanism 530 can include a morphing truss 530 or other similar structure as described herein for effecting extension and retraction of the chord plate 520. The morphing truss 530 can include a railing "A" attached to the spar 510 and a railing "B" attached to the chord plate 520. A cross brace C is connected between railings A and B and a cross brace D is connected between railings A and B as shown. Cross brace C is a single brace whereas cross brace D is a pair of braces. The pair of braces D can be provided for added stability and can be positioned such that cross brace C is sandwiched between the pair of cross braces D. It will be further appreciated that two or more sets of cross braces C, D can be provided between the opposed railings A, B. Ends of the cross braces can be mounted to the railings A, B with sliding connections to enable compression and expansion of the cross braces C, D, as will be described in connection with FIGS. 6 through 8.

A step can be included in the outer cross-braces to accommodate its operation as the thickness of the airfoil decreases towards the trailing edge. In addition, linear slides can be connected to outer ends of the railing B. Upon extension and retraction of the morphing truss, the linear slides can slide within inner side walls of the rotor blade 500. This decreases the bending moment on the X-truss, thus decreasing the friction between joints. The motor 542 can be, for example, a stepper motor. The motor 542 can drive the extension and retraction of the morphing truss 530 and in turn extend the morphing truss 530 to realize chord plate extension and thus overall chord line increase. The motor 542 can likewise retract the truss 530 to a stowed position within the rotor blade.

In operation, and to deploy the chord plate 520, the morphing truss 530 can be positioned between the rear of the spar 510 and the chord plate 520, which can be about 30% of the chord line in the retracted configuration and extending to about 60% of the chord line in the fully-deployed configuration. Exemplary actuation mechanisms/morphing truss structures for use in exemplary embodiments are now depicted and described in connection with FIGS. 6A, 6B, 7A, 7B, 8A, and 8B.

Referring now to each of FIGS. 5A, 5B, and FIGS. 6A, 6B, 7A, 7B, 8A and 8B for exemplary configurations, a railing "A" can be attached to the rear of the spar and a railing "B" can be attached to the chord plate. For the inline and symmetric X-trusses (FIGS. 6 and 7), points E and F can be pinned to the rails, thereby allowing cross-braces C and D to rotate about points E and F, but allowing no translation on the rails. The cross braces can be pinned at junction I, and can be constrained to slide along the rails at points G and H. An actuator can be connected to point G (the driven point) whereas point H slides due to the kinematic constraints. In the figures, G and G' are moved in same direction for inline trusses and an opposite direction for X-trusses.

For a triangular truss (FIG. 8), members C and D can be pinned at junction F, and only point E is pinned to rail A, while point G can be driven to slide along rail A, and point F slides along rail B due to kinematic constraints. In selecting between the X-trusses and the triangular truss, consideration can be given to the spanwise actuation motion ($\Delta s$) required to obtain a certain deployment ($\Delta l$ and $\Delta l'$). To minimize actuator requirement, the deployment per unit actuation motion can be compared. This can be better for the X-trusses and can lead to the elimination of the triangular truss. Of the two X-trusses, the inline X-truss was selected because moving the points G and G' in the same direction can be more convenient. This is to be done by attaching points G and G' to threaded blocks which are translated along rail A through the rotation of an all thread rod running parallel to the spar and driven by an electric stepper motor. As points G and G' slide, the truss can morph to the extended configurations of FIGS. 6B, 7B and 8B.

Figure 9A:
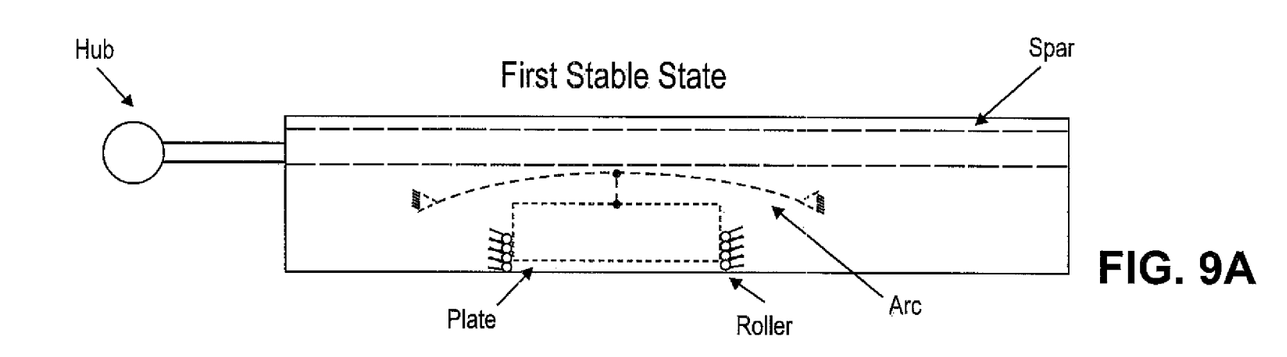
FIGS. 9A and 9B are schematic diagrams of alternative internal mechanisms of the variable chord rotor blade according to certain embodiments.
Figure 9B:
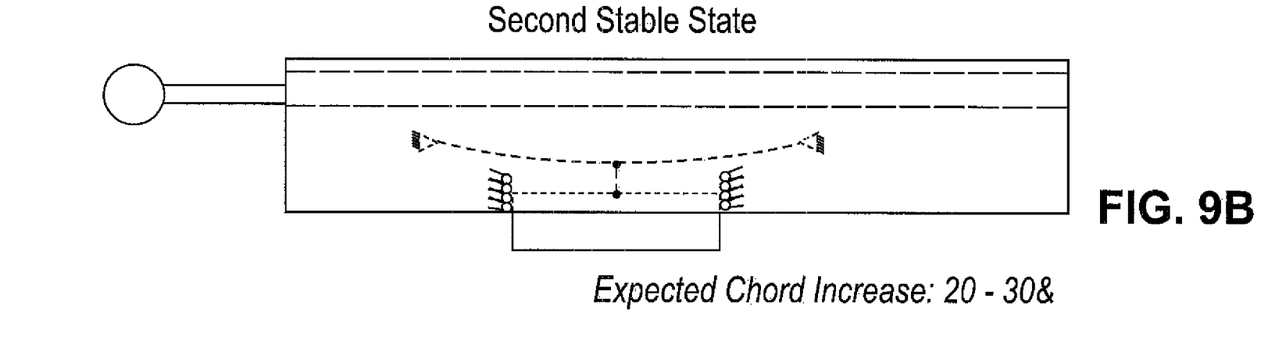

FIGS. 9A and 9B depict a variable chord section for a helicopter rotor blade according to certain embodiments. It should be readily apparent to those skilled in the art that FIGS. 9A and 9B are exemplary and that other elements can be added, removed or modified without departing from the scope of the exemplary embodiments.

In FIGS. 9A and 9B, the variable chord section can implement a bistable arc to induce chord extension. The bistable arc can be fixed at opposing ends thereof within the rotor blade. An extensible plate can be connected to a mid point of the bistable arc and slide along opposed rollers upon deflection of the bistable arc. Using the bistable arc, an expected chord increase of about 20-30% can be obtained.

Figure 10A:
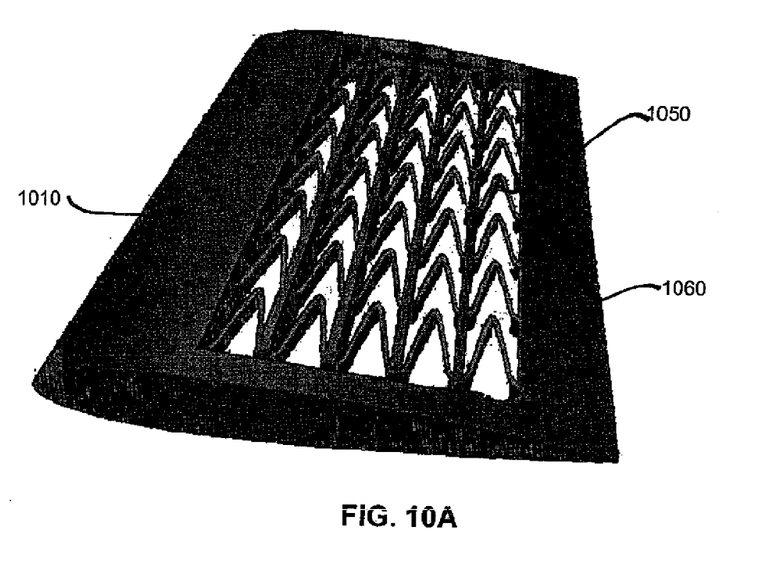
FIGS. 10A and 10B are schematic diagrams of further alternative internal configuration of an exemplary morphing cellular structure of the variable chord rotor blade according to certain embodiments.
Figure 10B:
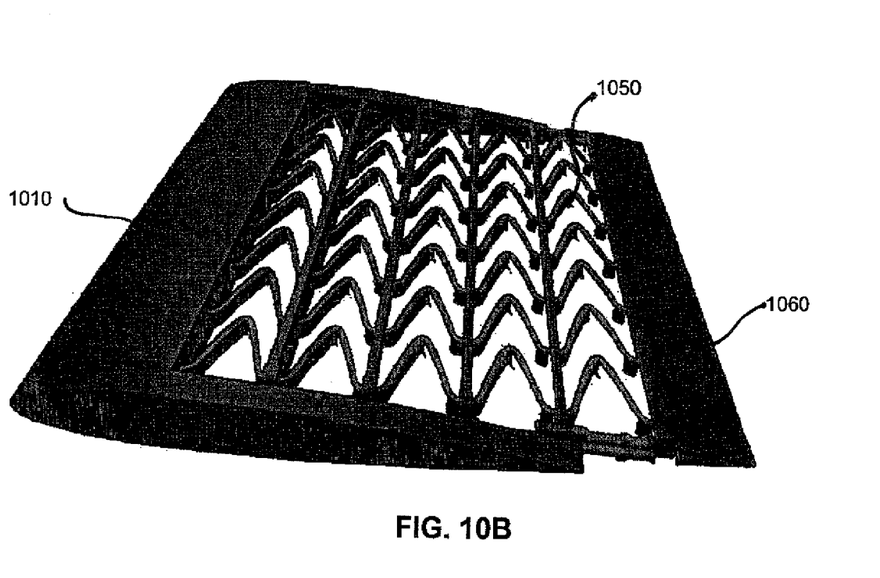

FIGS. 10A and 10B depict a variable chord section for a helicopter rotor blade according to certain embodiments. It should be readily apparent to those skilled in the art that FIGS. 10A and 10B are exemplary and that other elements can be added, removed or modified without departing from the scope of the exemplary embodiments.

In FIGS. 10A and 10B, the variable chord section can implement an extensible truss-like structure 1050 that assumes a configuration between a contracted or initial (e.g. stowed) position as depicted in FIG. 10A, and an elongated (e.g. deployed) position as depicted in FIG. 10B. The variable chord section can include a compliant truss-like structure and a skin formed over the compliant truss-like structure. The compliant structure 1050 can be formed to deploy from a spar 1010 and can terminate in a rigid trailing edge cap 1060. This represents a continuum variable length blade embodiment as opposed to the sliding embodiment of earlier figures.

As depicted, the compliant truss-like structure 1050 can include a plurality of interconnected cells that elongate and flex upon extension of the chord plate. Expansion and contraction can unfold and fold, e.g. expand and collapse, the interior cells of the truss structure. A collapsed truss-like structure can retract the chord plate into the rotor blade, while an expanded truss-like structure can extend the chord plate to an infinite number of extended positions to a fully deployed position.

Figure 11A:
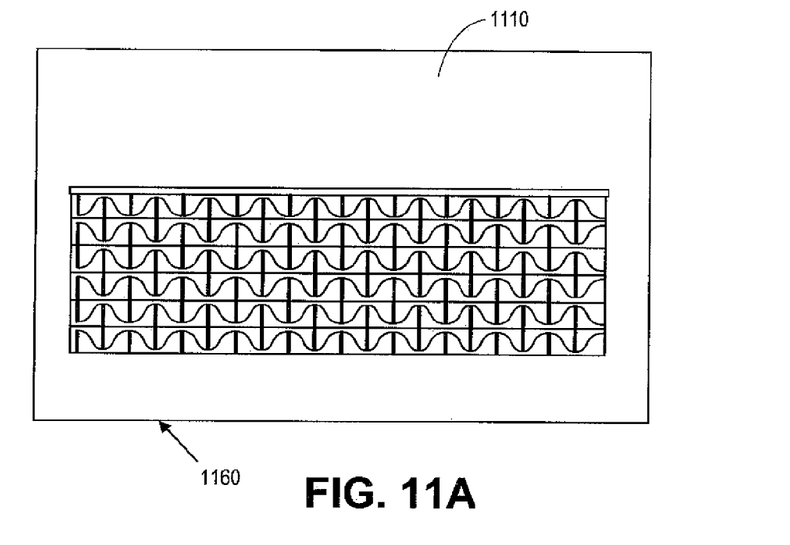
FIGS. 11A and 11B are schematic diagrams of still further alternative configuration of an exemplary morphing cellular structure of the variable chord rotor blade according to certain embodiments.
Figure 11B:
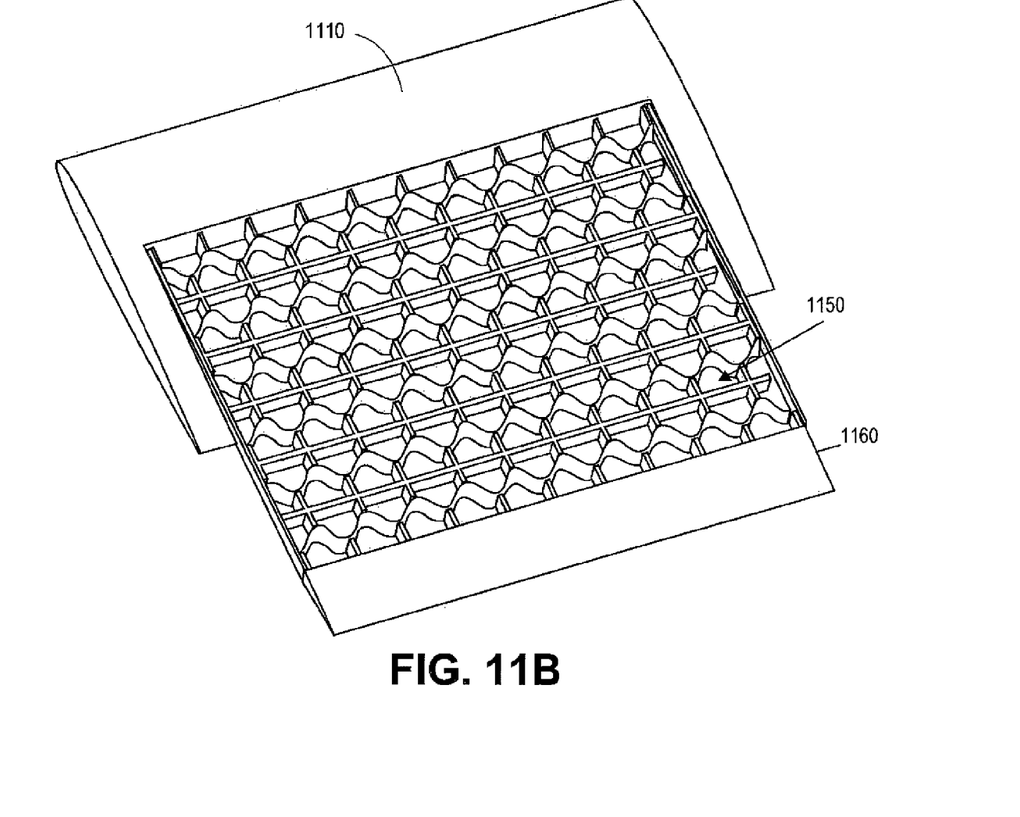

FIGS. 11A and 11B depict a variable chord section for a helicopter rotor blade according to certain embodiments. It should be readily apparent to those skilled in the art that FIGS. 11A and 11B are exemplary and that other elements can be added, removed or modified without departing from the scope of the exemplary embodiments.

In FIGS. 11A and 11B, the variable chord section can implement an alternative extensible truss-like structure 1150 that assumes a configuration between a contracted or initial (e.g. stowed) position as depicted in FIG. 11A, and an elongated (e.g. deployed) position as depicted in FIG. 11B. The variable chord section can include a compliant truss-like structure 1150 and a skin formed over the compliant truss-like structure. The compliant structure 1150 can be formed to deploy from a spar 1110 and can terminate in a rigid trailing edge cap 1160. This represents a continuum variable length blade embodiment.

As depicted, the compliant truss-like structure can include a plurality of interconnected cells that elongate and flex upon extension of the chord plate. Expansion and contraction can unfold and fold, e.g. expand and collapse, the interior cells of the truss structure. A collapsed truss-like structure can retract the chord plate into the rotor blade, while an expanded truss-like structure can extend the chord plate to an infinite number of extended positions to a fully deployed position.

Assembly of the variable chord morphing rotor blade can be separated into two parts—blade structure and the morphing X-truss mechanism. The blade structure can include the spar, ribs, and skin. The ribs can be machined out of aluminum using a water jet cutter and can be screwed into the spar. The skin can be made of aluminum sheet that has been bent to the contour of the airfoil and connected to the ribs and spar via countersunk screws. The division of the skin into leading edge and trailing edge sections allows for easy access to the variable chord mechanism. Along the spar, two rows of screws, spaced 2 inches apart, can connect both the leading edge and trailing edge skin sections. A slit can be cut out along the trailing edge of the skin to allow the chord plate to slide in and out of the rotor blade in a direction of the chord line. The flat plate can be bolted to the trailing edge railing and the pins that connect the cross braces and railings can be secured using hair pin clips. The linear slides and spar railing can be bolted to the ribs and spar, respectively.

Overall, the rotor blade can have a spanwise length of about 20.5 inches, the mechanism itself occupying about 15.3 inches. In a fully retracted position, the mechanism, less the flat chord plate, has a chordwise dimension of about 2.25 inches. At a full extension, the variable chord system can achieve an extension of about 3 inches, which corresponds to a 28% increase over the baseline chord dimension.

As will be clear to those of skill in the art, the components of a rotor blade according to exemplary embodiments can be constructed from various materials, including metal and composites. For example, components of a rotor blade can be constructed from aluminum or carbon fiber composites.

The exemplary embodiments promote numerous technical advantages, including but not limited to improved maneuverability, longevity, manufacturability, and reliability. For example, chord morphing can benefit acoustics because increasing a chord allows reduction in RPM, while still avoiding stall. Now noise is proportional to the fifth power of tip speed. Nothing is as effective at reducing noise as reducing tip-speed. The helicopter can be operated in "quiet" or "stealthy" mode by reducing tip speed (by about 10-15%) and compensating by extending the chord. Another benefit indirectly relates to vibration through stall alleviation.

At high payloads/altitudes, the baseline rotor would operate at high-pitch, approaching stall. Extra chord can allow generation of lift without approaching stall and allow the helicopter to operate in these conditions. Further, an increase in max-speed can be obtained. Max-speed can be determined by the onset of compressibility on the advancing side and stall on the retreating side. Increasing the chord can clearly alleviate stall while slowing down the rotor (10-15%) will alleviate compressibility but make the rotor more susceptible to stall. In at least this instance, chord increase can significantly improve operation.

An equation exemplary of the relationships herein is: $u_T=\Omega R+V$, where $\Omega R$ is angular velocity times rotor radius, and V is airspeed. If $\Omega R$ reduced by 15%, then V can be increased by 15% to keep the same advancing tip Mach number. An attack aircraft with a max speed of 160 knots could go 184 knots. Rotor blades with a fixed larger chord would suffer from a higher profile drag and power requirement in conditions such as low altitude, low gross-weight, cruise speed operation, wherein high lift generation is not demanded. In contrast, the exemplary chord morphing herein enables envelope expansion—higher altitude, payload, max speed; capabilities that baseline aircraft did not have. But when operating well inside the flight envelope (and not at its boundaries), extra chord would imply larger profile drag (which in turn means lower range/payload). That's why chord can be selectively increased only when needed, for example, at the edges of the envelope (to expand it). In addition, reduction in rotor RPM will reduce noise but requires the rotor to operate at higher pitch values, making it susceptible to stall. With extendable chord technology, RPM can be reduced to reduce noise, while chord increase helps to compensate and generate enough lift without high pitch requirement and susceptibility to stall.

While the invention has been described with reference to the exemplary embodiments thereof, those skilled in the art will be able to make various modifications to the described embodiments without departing from the true spirit and scope. The terms and descriptions used herein are set forth by way of illustration and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising". As used herein, the term "one or more of" with respect to a listing of items such as, for example, A and B, means A alone, B alone, or A and B.

Additional details of embodiments of the present invention are provided in a paper attached hereto as Appendix A. Other embodiments of the present disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A helicopter rotor comprising:
a rotor hub;
a rotor blade connected to the rotor hub, the rotor blade comprising a baseline airfoil chord length between a leading edge and a trailing edge of the rotor blade;
a quasi-static chord section extensible linearly from the trailing edge of the rotor blade and selectively fixable at an adjusted chord length according to helicopter flight conditions, the adjusted airfoil chord length of the rotor blade corresponding to extension of the quasi-static chord section relative to the baseline airfoil chord length;
an actuator positioned at least partially in the rotor blade; and
a linkage coupled with the actuator, the rotor blade, and the quasi-static chord section, wherein the actuator is configured to extend and retract the quasi-static chord section via the linkage and the linkage is configured to provide a stiff connection between the rotor blade and the quasi-static chord section,
wherein the quasi-static chord section is extensible to increase the adjusted chord length when the flight speed, altitude, gross weight, or a combination thereof are increased.

2. The rotor of claim 1, wherein the helicopter flight conditions comprise helicopter speed, altitude, and gross weight.

3. The rotor of claim 2, wherein the quasi-static chord section is retractable to decrease the adjusted chord length when the flight speed, altitude, gross weight, or a combination thereof are decreased.

4. The rotor of claim 1, wherein the quasi-static chord section is configured in flight.

5. The rotor of claim 1, wherein extension of the quasi-static chord section at a maximum flight condition enables envelope expansion of that flight condition.

6. The rotor of claim 5, wherein envelope expansion comprises higher altitude, higher payload, and greater maximum speed relative to a baseline chord length at that altitude, payload and maximum speed.

7. The rotor of claim 5, wherein envelope expansion is at a flight envelope boundary.

8. The rotor of claim 1, wherein flight conditions comprise a reduced rotor blade tip speed and increased airfoil chord length relative to the baseline airfoil chord length, to reduce rotor noise.

9. The rotor of claim 8, wherein tip speed is reduced by about 10% to about 15% when the quasi-static chord piece is extended.

10. The rotor of claim 1, further comprising a morphing truss operatively connected between a spar of the rotor blade and the quasi-static chord section.

11. The rotor of claim 1, further comprising a bi-stable element operatively connected between a spar of the rotor blade and the quasi-static chord section.

12. The rotor of claim 1, further comprising an expansible cellular web operatively connected between a spar of the rotor blade and the quasi-static chord section.

13. The rotor of claim 1, further comprising plural quasi-static chord sections.

14. A helicopter rotor, comprising:
a rotor hub;
a rotor blade connected to the rotor hub, the rotor blade comprising a baseline airfoil chord length between a leading edge and a trailing edge of the rotor blade;
a quasi-static chord section extensible linearly from the trailing edge of the rotor blade and selectively fixable at an adjusted chord length according to helicopter flight conditions, the adjusted airfoil chord length of the rotor blade corresponding to extension of the quasi-static chord section relative to the baseline airfoil chord length;
an actuator positioned at least partially in the rotor blade; and
a linkage coupled with the actuator, the rotor blade, and the quasi-static chord section, wherein the actuator is configured to extend and retract the quasi-static chord section via the linkage and the linkage is configured to provide a stiff connection between the rotor blade and the quasi-static chord section,
wherein the airfoil chord length can be increased relative to a nominal chord length, at nominal rotor RPM or in conjunction with an increase or decrease in rotor RPM, at different helicopter flight speeds, altitudes and gross weights.

15. The rotor of claim 14, wherein an adjusted airfoil chord length is up to 30% greater than the baseline airfoil chord length.

16. A helicopter rotor of claim 1, comprising:
a rotor hub;
a rotor blade connected to the rotor hub, the rotor blade comprising a baseline airfoil chord length between a leading edge and a trailing edge of the rotor blade;
a quasi-static chord section extensible linearly from the trailing edge of the rotor blade and selectively fixable at an adjusted chord length according to helicopter flight conditions, the adjusted airfoil chord length of the rotor blade corresponding to extension of the quasi-static chord section relative to the baseline airfoil chord length;
an actuator positioned at least partially in the rotor blade; and
a linkage coupled with the actuator, the rotor blade, and the quasi-static chord section, wherein the actuator is configured to extend and retract the quasi-static chord section via the linkage and the linkage is configured to provide a stiff connection between the rotor blade and the quasi-static chord section,
wherein the quasi-static chord section is extensible between a fully-retracted position and a fully-extended position, and is fixable at a plurality of positions between the fully-retracted position and fully-extended position.

* * * * *